(12) United States Patent
Reddy

(10) Patent No.: US 12,728,720 B2
(45) Date of Patent: Sep. 8, 2026

(54) VEHICLE AXLE DISCONNECT SYSTEM

(71) Applicant: FCA US LLC, Auburn Hills, MI (US)

(72) Inventor: Ritvik Reddy, Ferndale, MI (US)

(73) Assignee: FCA US LLC, Auburn Hills, MI (US)

( * ) Notice: Subject to any disclaimer, the term of this patent is extended or adjusted under 35 U.S.C. 154(b) by 492 days.

(21) Appl. No.: 18/354,953

(22) Filed: Jul. 19, 2023

(65) Prior Publication Data

US 2025/0026197 A1 Jan. 23, 2025

(51) Int. Cl.
*B60K 23/08* (2006.01)

(52) U.S. Cl.
CPC ................................ *B60K 23/0808* (2013.01)

(58) Field of Classification Search
CPC .................................................. B60K 23/0808
See application file for complete search history.

(56) References Cited

U.S. PATENT DOCUMENTS

| | | | | |
|---|---|---|---|---|
| 2006/0205555 | A1* | 9/2006 | Bowen | B60K 23/0808 475/204 |
| 2008/0182695 | A1 | 7/2008 | Showalter | |
| 2010/0094519 | A1* | 4/2010 | Quehenberger | B60W 10/02 701/69 |
| 2021/0155219 | A1* | 5/2021 | Alcantar | B60W 10/08 |

FOREIGN PATENT DOCUMENTS

| | | | | |
|---|---|---|---|---|
| CN | 108394273 A | * | 8/2018 | B60K 23/08 |
| DE | 102019200325 B4 | * | 3/2022 | B60K 17/34 |
| EP | 0226472 B1 | * | 2/1991 | B60K 23/0808 |
| JP | 5808601 B2 | * | 11/2015 | B60K 23/0808 |

OTHER PUBLICATIONS

Blue Oval Trucks; Everything You Wanted to Know About the IWE System . . . And Then Some; Copyright 2023 https://www.blueovaltrucks.com/tech-articles/everything-you-wanted-to-know-about-the-iwe-system-and-then-some/.

* cited by examiner

*Primary Examiner* — Drew J Brown

(74) *Attorney, Agent, or Firm* — Jeremy J. Klobucar

(57) ABSTRACT

A method of controlling actuation of torque transfer devices in a vehicle includes determining that a first torque transfer device and a second torque transfer device that are associated with a vehicle axle are in a disconnected state in which the torque transfer devices are not transmitting torque, comparing a driving parameter to one or more thresholds; and changing the first torque transfer device to a connected state when the driving parameter meets said one or more thresholds.

16 Claims, 2 Drawing Sheets

VEHICLE AXLE DISCONNECT SYSTEM

FIELD

The present disclosure relates to a disconnect system for a vehicle axle that permits independent connection of torque transfer devices in a desired manner.

BACKGROUND

Vehicles may include two clutches associated with the same axle and each associated with a different one of the wheels on the axle. Engaging the clutches is done simultaneously by synchronizing to an average rotary speed, or sequentially by first synchronizing a first clutch to a rotary speed of a first wheel, and then engaging the first clutch, and thereafter synchronizing a second clutch to a rotary speed of a second wheel, and then engaging the second clutch. When there is a greater difference between the rotary speeds of the wheels, the process of engaging the clutches simultaneously can have problems if the average rotary speed is not within a desired speed for the clutches, and when engaged sequentially can take a longer time to accomplish. Hence, when a vehicle is navigating a turn and engagement of the clutches is desired, the engagement of both clutches can be problematic.

SUMMARY

In at least some implementations, a method of controlling actuation of torque transfer devices in a vehicle includes determining that a first torque transfer device and a second torque transfer device that are associated with a vehicle axle are in a disconnected state in which the torque transfer devices are not transmitting torque, comparing a driving parameter to one or more thresholds; and changing the first torque transfer device to a connected state when the driving parameter meets said one or more thresholds.

In at least some implementations, the one or more thresholds is a first threshold of a magnitude of lateral acceleration of the vehicle. In at least some implementations, the method includes changing the second torque transfer device to a connected state when the magnitude of the lateral acceleration of the vehicle meets a second threshold that is higher than the first threshold.

In at least some implementations, the one or more thresholds includes a first lateral acceleration threshold relating to a magnitude of lateral acceleration of the vehicle, and a speed threshold relating to a magnitude of vehicle speed. In at least some implementations, the method includes changing the second torque transfer device to a connected state when the magnitude of the lateral acceleration of the vehicle meets a second lateral acceleration threshold that is higher than the first lateral acceleration threshold. In at least some implementations, the first lateral acceleration threshold varies as a function of the amount by which the vehicle speed exceeds the speed threshold. In at least some implementations, the first lateral acceleration threshold decreases when the amount by which the vehicle speed exceeds the speed threshold increases.

In at least some implementations, the method includes determining a rotational speed of a first wheel on a vehicle axle associated with both the first torque transfer device and the second torque transfer device, and determining a rotational speed of a second wheel on the vehicle axle. And the first torque transfer device is associated with the one of the first wheel and the second wheel that has a lesser rotational speed.

In at least some implementations, the one or more thresholds is met when the vehicle is being driven in a performance driving mode. In at least some implementations, in the performance driving mode, a prime mover of the vehicle causes a greater rate of acceleration for a given throttle input than in another driving mode of the vehicle. In at least some implementations, in the performance driving mode, a suspension system of the vehicle is stiffer than in another driving mode of the vehicle.

In at least some implementations, at least one of the one or more thresholds varies as a function of an ambient temperature.

In at least some implementations, an assembly for a vehicle, includes a first shaft adapted to be coupled to a first wheel for rotation with the first wheel, a first torque transfer device having a connected state in which an input torque is sometimes transmitted through the first torque transfer device to the first shaft, and disconnected state in which the input torque is not transmitted through the first torque transfer device to the first shaft. The assembly further includes a second shaft adapted to be coupled to a second wheel for rotation with the second wheel and a second torque transfer device having a connected state in which an input torque is sometimes transmitted through the second torque transfer device to the second shaft, and disconnected state in which the input torque is not transmitted through the second torque transfer device to the second shaft. An accelerometer has an output that corresponds to a lateral acceleration of the vehicle and a control system is connected to the accelerometer, the first torque transfer device and the second torque transfer device. The controller controls a change of the state of one or both of the first torque transfer device and the second torque transfer device between the connected and disconnected states, and the controller is responsive to the output of the accelerometer to change one of the first torque transfer device and the second torque transfer device from the disconnected state to the connected state when the output from the accelerometer is greater than a first threshold.

In at least some implementations, the controller is adapted to change the second torque transfer device to the connected state when the output from the accelerometer is greater than a second threshold that is greater than the first threshold.

In at least some implementations, a drive shaft, a differential coupled to the drive shaft, a first intermediate shaft coupled to the differential and to the first torque transfer device and a second intermediate shaft coupled to the differential and to the second torque transfer device, wherein torque is selectively transferred from the drive shaft to the first shaft via the differential, the first intermediate shaft and the first torque transfer device, and torque is selectively transferred from the drive shaft to the second shaft via the differential, the second intermediate shaft and the second torque transfer device.

In at least some implementations, the first shaft and second shaft are coupled to respective ones of a pair of rear wheels of a vehicle. In at least some implementations, the first shaft and second shaft are coupled to respective ones of a pair of front wheels of a vehicle.

A first torque transfer device may be actuated and connected in an axle assembly before vehicle driving parameters require such connection. This enables a second torque transfer device to be actuated and connected to the axle assembly more quickly, when needed. The earlier connection of the first torque transfer device can be done in response to one or more vehicle parameters in a predictive manner and in advance of a dynamic driving event, such as lateral acceleration leading to vehicle wheels sliding on the road. In this way, the earlier connection of the first torque transfer device is a precautionary action that readies the system for full actuation more quickly.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
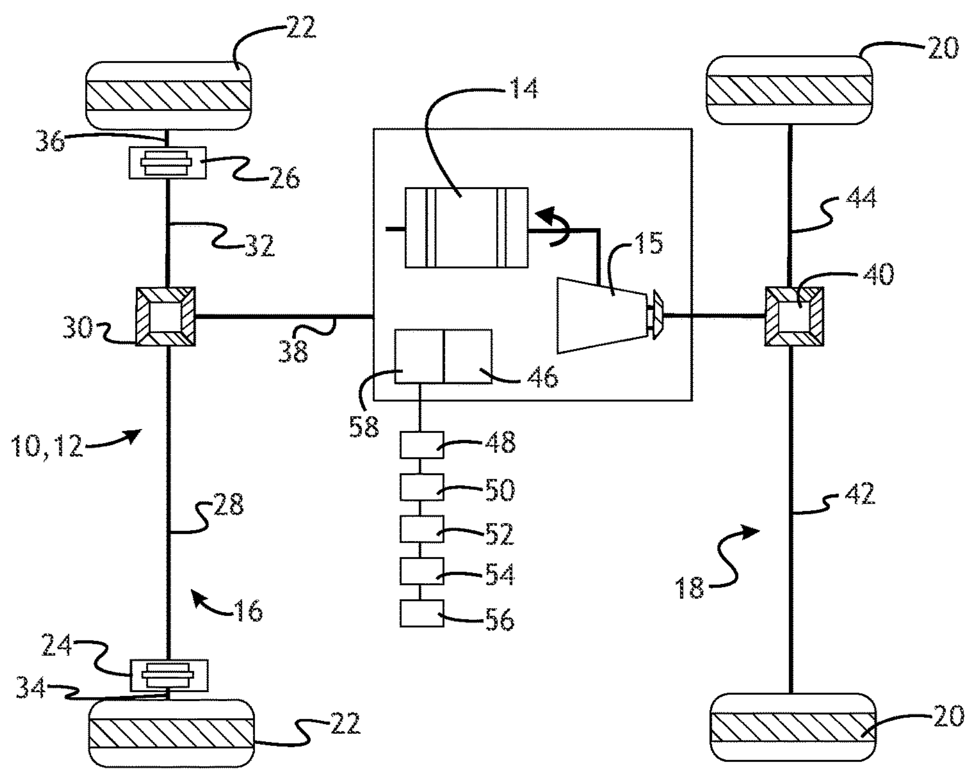
FIG. 1 is a diagrammatic view of part of a vehicle drivetrain.

Referring in more detail to the drawings, FIG. 1 illustrates part of a drivetrain 10 of a vehicle 12 that includes a prime mover 14, a transmission 15 a front axle assembly 16 and a rear axle assembly 18. In the example shown, the vehicle 12 includes a two-wheel drive mode in which the prime mover 14 is coupled to and drives rear wheels 20 that are coupled to the rear axle assembly 18, and an all-wheel drive mode in which the prime mover 14 also drives front wheels 22 that are coupled to the front axle assembly 16. In the example shown, the front axle assembly 16 includes a pair of torque transfer devices 24, 26 that selectively provide or interrupt torque transmission to the front wheels 22 to enable changing between the two-wheel and all-wheel drive modes. When the torque transfer devices 24, 26 are in a connected state, torque is transmitted through the devices to the associated wheels 22, and when the torque transfer devices 24, 26 are in a disconnected state, torque is not transmitted through the devices and torque is not provided to the associated wheels 22. While the prime mover 14 is shown as connected directly to the rear axle assembly 18, the prime mover 14 could instead drive the front axle assembly 16 and the torque transfer devices 24, 26 can be part of the rear axle assembly 18, or two prime movers may be used, each associated with a separate one of the axle assemblies 16, 18.

In the example shown, the front axle assembly 16 extends between and is coupled to the front wheels 22. The front axle assembly 16 also includes a first intermediate shaft 28 coupled to a differential 30 and to the first torque transfer device 24, a second intermediate shaft 32 coupled to the differential 30 and to the second torque transfer device 26, a first shaft 34 coupled to the first torque transfer device 24 and to a first front wheel 22 and a second shaft 36 coupled to the second torque transfer device 26 and to a second front wheel 22. In other embodiments, the shafts 34, 36 are not needed and the torque transfer devices 24, 26 may interact directly with the wheels (e.g. hubs thereof). A drive shaft 38 extends between the differential 30 of the front axle assembly 16 and a differential 40 of the rear axle assembly 18 and provides an input torque to the front axle differential 40.

The rear axle assembly 18 extends between and is coupled to the rear wheels 20. The rear axle assembly 18 also includes a first halfshaft 42 coupled to the rear differential 40 and to a first rear wheel 20, and a second intermediate shaft 44 coupled to the differential 40 and to a second rear wheel 20.

The torque transfer devices 24, 26 may be any suitable device that has a connected state in which torque is transmitted through the device and a disconnected state in which torque is not transmitted through the device. For example, a dog clutch, a wet or dry multi-plate friction clutch, or an overrunning clutch or other clutch or similar device may be used as a torque transfer device. The torque transfer devices 24, 26 may be connected when distribution of torque to the front wheels 22 is desired, and disconnected when such distribution of torque is not needed, for example, to improve fuel economy.

The first and second torque transfer devices 24, 26 are provided between the front differential 30 and a respective/separate one of the front wheels 22. So arranged, each torque transfer device 24, 26 can be actuated to change states independently of the other. For example, the first torque transfer device 24 can be in the connected state while the second torque transfer device 26 is in the disconnected state. In this condition, neither front wheel 22 would be actively driven.

To facilitate smooth engagement of the disconnect devices 24, 26 when they are moved from their disconnected state to their connected state, a synchronizing mechanism may increase the rotary speed of a non-driven portion of the device 24, 26 to or closer to (e.g. within the slip speed of the clutch/device) the rotary speed of a driven portion. When the vehicle is turning, one of the front wheels 22 rotates faster than the other, and when it is desired to change the torque transfer devices 24, 26 from their disconnected states to their connected states, the different wheel speeds present challenges in synchronizing to the different speeds. One way to manage the connection of the two torque transfer devices 24, 26 when a vehicle is turning is to engage the devices in series. First, the torque transfer device 24 or 26 associated with the wheel 22 spinning at a lower speed may be coupled as synchronization to the lower speed can happen first and sooner than synchronizing to a higher speed. After the first device 24 or 26 is in the connected state, the second device 24 or 26 may be changed to its connected state after a further synchronizing speed increase.

It takes some time to connect both torque transfer devices 24, 26 in this manner and, in some situations, it can be desirable to reduce the time to connect the devices 24, 26. For example, if the vehicle 12 exceeds a lateral acceleration threshold magnitude, which can result in wheels 20, 22 sliding on the road, connection of the torque transfer devices 24, 26 can improve the control and stability of the vehicle. In this way, a control system 46 which may include one or more controllers may automatically actuate the torque transfer devices 24, 26 to their connected state if a lateral acceleration threshold is exceeded, to facilitate management of wheel speeds via stability controls of the vehicle if and when needed. The lateral acceleration threshold may be set below a lateral acceleration magnitude or level at which the vehicle wheels will slide, in at least some implementations, to improve the chances that the torque transfer devices 24, 26 can be connected before the wheels slide and so the vehicle is more responsive if such an event occurs.

The vehicle may thus include an accelerometer 48 that provides an output that corresponds to the magnitude of lateral acceleration of the vehicle to the control system 46. Because the rate of lateral acceleration change can be greater when the vehicle speed is greater, a vehicle speed sensor 50 may also be coupled to or communicated with the control system 46, as can one or more wheel speed sensors 52 that provide information regarding wheel rotational speeds. Further, response time/rate of the torque transfer devices 24, 26 may change as a function of temperature, so a temperature sensor 54 may be provided, to provide information about either or both ambient temperature and the temperature of the devices 24, 26. The system may be able to predict lateral acceleration by use of sensors 56 and data relating to steering angle, throttle position, rotary speed of the prime mover 14 and torque of the prime mover 14. And the vehicle may include a communication bus 58 capable of relaying to the control system 48 the vehicle and environmental conditions and information.

Thus, reducing the time to connect the torque transfer devices 24, 26 can prevent or limit the loss of control and improve the control and stability of the vehicle, for example, during a fast turn (turn executed at higher speed) with higher magnitude lateral acceleration forces. By connecting one of the torque transfer devices 24, 26 sooner than actually needed for a dynamic driving event, the system can respond more rapidly if such an event occurs.

To do this, one or more driving parameters may be checked against thresholds for such driving parameters, and when one or more of the thresholds are met, a first one of the torque transfer devices 24 or 26 may be connected. Thereafter, if one or more driving parameters meet a second threshold, the other torque transfer device 24 or 26 can also be connected which can occur more readily due to the prior connection of one torque transfer device. If the driving parameters being monitored are reduced in nature, one or both torque transfer devices 24, 26 can again be disconnected, as desired.

Figure 2:
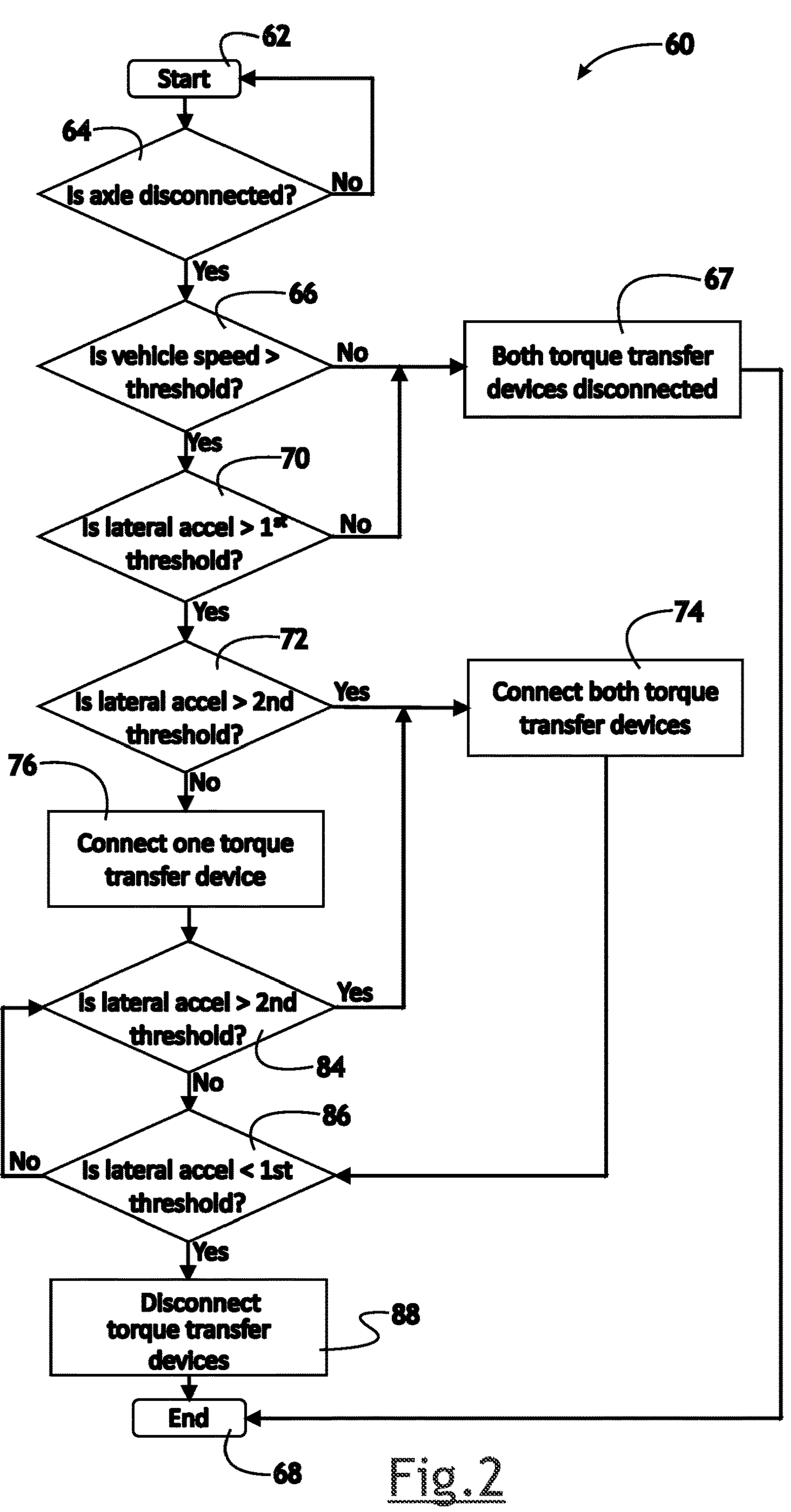
FIG. 2 is a flowchart of a method for controlling actuation of torque transfer devices.

FIG. 2 illustrates a method to improve the actuation of the torque transfer devices 24, 26. In the method, a first one of the torque transfer devices is actuated before the other, when certain conditions are met. Doing this readies the system for actuation of the other torque transfer device and reduces the time to get the vehicle into all-wheel drive mode for improved stability when needed. In the intermediate connection phase, the connection of one torque transfer device 24 or 26 can improve the all-wheel drive response time while retaining some benefits of disconnection via the disconnected other torque transfer device (e.g. some fuel economy improvement from not driving all four wheels and from reduced drag in the partially connected state).

Method 60 may begin at 62 with an input above a threshold, such as a lateral acceleration of some magnitude that makes it desirable to monitor whether connection of the torque transfer devices 24, 26 might be desirable, or the system may continually run the method in the background, as desired. In step 64 it is determined if the torque transfer devices 24, 26 are in the connected or disconnected state. If the devices are connected, then the method 60 can end or return to start 62 and wait for an instance in which connection of disconnected devices 24, 26 might be desirable. If the devices are disconnected, then the method may continue to step 66.

In step 66, the vehicle speed is checked against a speed threshold. If the vehicle speed is below the speed threshold then the method 60 may leave both devices 24, 26 disconnected in step 67 and may end at 68. In at least some implementations, the more rapidly occurring dynamic driving events of interest occur at higher vehicle speeds and not at lower speeds and so no action need be taken if the vehicle is traveling at a lower speed. If it is determined in step 66 that the vehicle speed is above the speed threshold, then the method 60 continues to step 70 in which it is determined if the vehicle lateral acceleration is greater than a first acceleration threshold, such as when the vehicle is navigating a turn at a relatively high rate of speed for the severity/radius of the turn.

So in this example method 60, vehicle speed and lateral acceleration are two driving parameters that are checked against thresholds to determine if connection of a torque transfer device should occur. In this example, if the either the vehicle speed is below the speed threshold in step 66, or the lateral acceleration is below the first acceleration threshold in step 70, then the method proceeds to step 67 and the torque transfer devices may remain disconnected. It is noted that, in at least some implementations, the method may be performed without step 66 (so without checking vehicle speed) and by checking only lateral acceleration against one or more lateral acceleration thresholds, or by checking one or more other driving parameters as noted elsewhere herein.

The first acceleration threshold may be lower than a second acceleration threshold at which both torque transfer devices 24, 26 are connected to be ready for, by way of example, a possible stability system interaction. In step 72, it is determined if the vehicle lateral acceleration is greater than the second acceleration threshold, and if so, in step 74 then both torque transfer devices 24 and 26 are changed to their connected state. When the lateral acceleration meets the first acceleration threshold but not the second acceleration threshold, the method 60 in step 76 changes the state of one torque transfer device 24 or 26 from the disconnected state to the connected state.

Figure 3:
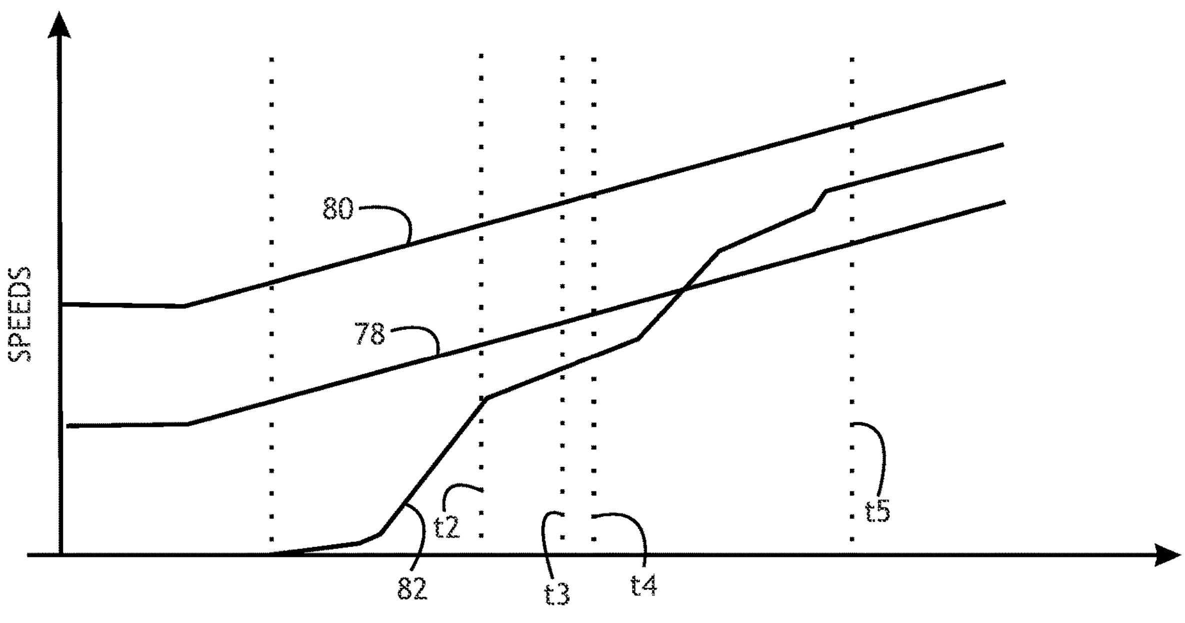
FIG. 3 is a graph showing actuation of torque transfer devices as a function of lateral acceleration of the vehicle.

In at least some implementations, the torque transfer device 24 or 26 that is changed in step 76 to the connected state is associated with the wheel 22 that is rotating slower than the other wheel 22 as the vehicle turns as this torque transfer device can be connected sooner time-wise than the device associated with the wheel rotating at higher speed. This is shown in FIG. 3 where the rotary speed of a first front wheel 22 is shown by line 78, the rotary speed of a second front wheel 22 is shown by line 80, and vehicle lateral acceleration is shown by line 82. In this chart, the vehicle lateral acceleration exceeds the first acceleration threshold at time t1 and the torque transfer device associated with the first front wheel is connected at time t2.

In this state, the system can more quickly connect the other torque transfer device 24 or 26 if certain conditions occur, such as an increase in lateral acceleration beyond the second acceleration threshold, which is checked in step 84. As noted above, the second acceleration threshold may be set below a magnitude of lateral acceleration at which some vehicle wheels 20, 22 slide or skid on the road. Connecting the second torque transfer device at this higher, second acceleration threshold puts the vehicle in all-wheel drive mode for increased stability during the maneuver creating the conditions that caused the system to connect the torque transfer devices 24, 26. This is shown in FIG. 3, at time t3 the vehicle lateral acceleration meets the second acceleration threshold, and at time t4 the torque transfer device associated with the second front wheel 22 is connected. Without the first torque transfer device already being connected, the second torque transfer device would not be connected until time t5, in the example shown in FIG. 3. Thus, the difference between time t4 and t5 is the time reduction to get the second torque transfer device connected and is a significant improvement in the context of a dynamic driving event.

If the vehicle lateral acceleration reduces to a level below the first acceleration threshold, which is checked in step 86 then in at least some implementations connection of one or both torque transfer devices 24, 26 is not needed. So, when this occurs, whichever (e.g. one or both) torque transfer devices were connected in performance of the method 60 can be disconnected in step 88, and the method 60 can end and be performed again (i.e. from the start) when a condition exists that causes the system to do so.

By way of non-limiting examples, the first acceleration threshold may be between 0.2 g and 0.5 g, for example 0.35 g, and the second acceleration threshold may be between 0.35 g and 0.6 g, for example 0.5 g. In one example, when the torque transfer devices 24, 26 are in their disconnected states and the vehicle's lateral acceleration reaches 0.35 g, one of the torque transfer devices is actuated to change it to the connected state. If the vehicle's lateral acceleration falls below 0.35 g, then the connected torque transfer device can be disconnected (with perhaps some time delay, or when lateral acceleration falls below a third acceleration threshold that is lower than the first acceleration threshold by an amount sufficient to prevent or inhibit repeated connection and disconnection). If the vehicle's lateral acceleration increases to 0.5 g, then the second torque transfer device is connected, and may remain connected until the vehicle's lateral acceleration reduces (e.g. to or below the first acceleration threshold or the third acceleration threshold). Instead of a second acceleration or speed threshold, the system may be arranged to engage the second torque transfer device upon initiation of a stability, traction control or anti-lock braking system of the vehicle during a dynamic driving event. With a first one of the torque transfer devices already connected, the other, second torque transfer device can be more readily connected enabling a control scheme as noted.

The magnitude of the thresholds may be variable and in response to other parameters. For example, if the vehicle speed is greater, then the vehicle's lateral acceleration may change more rapidly than when the vehicle speed is lower. Thus, a higher vehicle speed may cause the first acceleration threshold and/or other acceleration thresholds to be lower so that the first to be connected torque transfer device is connected sooner and more time is provided to connect the second torque transfer device in view of a possible higher rate of lateral acceleration. In at least some implementations, the speed threshold used in methods like method 60, may be between 16 mph and 50 mph.

Similarly, cold temperatures can slow the movement/actuation of the torque transfer devices 24, 26, particularly if they include lubricant or other fluid the viscosity of which increases as temperature decreases. Thus, a method may check the temperature against a temperature threshold and alter one or more of the acceleration thresholds as a result. Still further vehicle parameters, like steering angle, prime mover rotary speed and/or torque level, may be considered and used to adjust one or more thresholds, as desired. Additionally, some vehicles including multiple drive modes, like touring, sport and track modes, that change things like throttle response, transmission shift rate, steering feel and suspension stiffness.

Additionally or instead, the method could include changing the acceleration thresholds based upon the drive mode selected, or simply and preemptively connecting one of the torque transfer devices whenever a performance driving mode is selected (e.g. sport or track mode, compared to a touring or normal mode) as increased accelerations are more likely when a driver has intentionally selected a performance driving mode. In other words, the selected driving mode of the vehicle can be a driving parameter for which a threshold is set and checked in a method of operating the torque transfer devices 24, 26. This driving parameter could be sufficient by itself to cause connection of at least one torque transfer device, or it may be used in conjunction with other driving parameters for torque transfer device control, as desired.

Another example is when the size of the wheels are different from each other, such as may occur when a small, spare tire is installed on the vehicle, which can cause different rotary speeds for the wheels. When the vehicle detects such wheel rotary speed differences in straight travel of the vehicle, then the system may connect the first one of the torque transfer devices. Further, the systems and methods described herein can help with faster engagement of an axle (e.g. the front axle) during kinetic energy recuperation a.k.a. regenerative braking, particularly when a single axle is not able to recuperate all the kinetic energy and a second axle needs to be connected to share the load of kinetic energy recuperation. This issue becomes exacerbated when the primary axle is on a traction limited surface, and quicker engagement of secondary axle is required to ensure that primary axle doesn't encounter skid conditions during regenerative braking. Still further, when the vehicle controller detects that the windshield wipers are being used or a rain sensor indicates the presence of rain, the method may be implemented to connect one torque transfer device or reduce the lateral acceleration threshold at which the first torque transfer device is connected. This may be done, for example, because roads may have lower friction when wet, and visibility may be reduced, and so dynamic vehicle events may be more likely on wet roads.

The system and method provide early engagement of a torque transfer device 24 or 26 to get ahead of and in advance of a possible vehicle stability/dynamic event. This early, pre-cautionary partial engagement can involve synchronizing and engaging the torque transfer device of only one wheel, where the prime mover 14 may be used for the rotary speed synchronization, and then bringing the prime mover 14 back to zero relative speed. Doing this causes a side gear in the differential 30 on the connected end, to rotate at the same speed as the connected wheel 22, and the unconnected side gear of the differential 30 will spin at the same speed as the connected side but in opposite direction (as in an open differential).

A benefit of such a tactical approach is that, when employed as part of a pre-emptive axle engagement strategy in anticipation of an impending stability or vehicle dynamics event, the time required to reach the all-wheel drive mode of vehicle operation is significantly reduced while at the same time still providing fuel economy benefits of having a partial axle disconnect. Furthermore, if the vehicle encounters an obstruction or variance in the road, like a large pothole or a bump or an object on the road, or experiences an anti-lock braking system event, while negotiating a sharp turn and also happens to be in the process of connecting the torque transfer devices 24, 26, the instantaneous change in wheel speed due to the road variance will change the slip speed across the clutches/devices 24, 26 leading to noise, vibration and harshness issues, and durability issues or failed torque transfer connection events. Partial engagement, with one torque transfer device already connected, reduces this concern to only one wheel.

What is claimed is:

1. A method of controlling actuation of torque transfer devices in a vehicle, comprising:

determining that a first torque transfer device that is associated with a vehicle axle is in a disconnected state in which the first torque transfer device is not transmitting torque;

determining that a second torque transfer device that is associated with the vehicle axle is in a disconnected state in which the second torque transfer device is not transmitting torque;

comparing a driving parameter to one or more thresholds; and changing the first torque transfer device to a connected state when the driving parameter meets said one or more thresholds, wherein the one or more thresholds includes a first threshold of a magnitude of lateral acceleration of the vehicle and the first torque transfer device is changed to the connected state when the magnitude of lateral acceleration of the vehicle is greater than the first threshold.

2. The method of claim 1 which also includes changing the second torque transfer device to a connected state when the magnitude of the lateral acceleration of the vehicle meets a second threshold that is higher than the first threshold.

3. The method of claim 1 wherein the one or more thresholds includes a speed threshold relating to a magnitude of vehicle speed.

4. The method of claim 3 which also includes changing the second torque transfer device to a connected state when the magnitude of the lateral acceleration of the vehicle meets a second lateral acceleration threshold that is higher than the first lateral acceleration threshold.

5. The method of claim 3 wherein the first lateral acceleration threshold varies as a function of the amount by which the vehicle speed exceeds the speed threshold.

6. The method of claim 5 wherein the first lateral acceleration threshold decreases when the amount by which the vehicle speed exceeds the speed threshold increases.

7. The method of claim 1 which also includes determining a rotational speed of a first wheel on a vehicle axle associated with both the first torque transfer device and the second torque transfer device, and determining a rotational speed of a second wheel on the vehicle axle, and wherein the first torque transfer device is associated with the one of the first wheel and the second wheel that has a lesser rotational speed.

8. The method of claim 1 wherein at least one of the one or more thresholds varies as a function of an ambient temperature.

9. A method of controlling actuation of torque transfer devices in a vehicle, comprising:

determining that a first torque transfer device that is associated with a vehicle axle is in a disconnected state in which the first torque transfer device is not transmitting torque;

determining that a second torque transfer device that is associated with the vehicle axle is in a disconnected state in which the second torque transfer device is not transmitting torque;

comparing a driving parameter to one or more thresholds; and changing the first torque transfer device to a connected state when the driving parameter meets said one or more thresholds, and wherein the one or more thresholds is met when the vehicle is being driven in a performance driving mode.

10. The method of claim 9 wherein, in the performance driving mode, a prime mover of the vehicle causes a greater rate of acceleration for a given throttle input than in another driving mode of the vehicle.

11. The method of claim 10 wherein, in the performance driving mode, a suspension system of the vehicle is stiffer than in another driving mode of the vehicle.

12. An assembly for a vehicle, including:

a first shaft adapted to be coupled to a first wheel for rotation with the first wheel;

a first torque transfer device having a connected state in which an input torque is sometimes transmitted through the first torque transfer device to the first shaft, and a disconnected state in which the input torque is not transmitted through the first torque transfer device to the first shaft;

a second shaft adapted to be coupled to a second wheel for rotation with the second wheel;

a second torque transfer device having a connected state in which an input torque is sometimes transmitted through the second torque transfer device to the second shaft, and disconnected state in which the input torque is not transmitted through the second torque transfer device to the second shaft;

an accelerometer having an output that corresponds to a lateral acceleration of the vehicle;

a control system connected to the accelerometer, the first torque transfer device and the second torque transfer device, wherein the controller controls a change of the state of one or both of the first torque transfer device and the second torque transfer device between the connected and disconnected states, and wherein the controller is responsive to the output of the accelerometer to change one of the first torque transfer device and the second torque transfer device from the disconnected state to the connected state when the output from the accelerometer is greater than a first threshold.

13. The assembly of claim 12 wherein the controller is adapted to change the second torque transfer device to the connected state when the output from the accelerometer is greater than a second threshold that is greater than the first threshold.

14. The assembly of claim 12 which also includes a drive shaft, a differential coupled to the drive shaft, a first intermediate shaft coupled to the differential and to the first torque transfer device and a second intermediate shaft coupled to the differential and to the second torque transfer device, wherein torque is selectively transferred from the drive shaft to the first shaft via the differential, the first intermediate shaft and the first torque transfer device, and torque is selectively transferred from the drive shaft to the second shaft via the differential, the second intermediate shaft and the second torque transfer device.

15. The assembly of claim 12 wherein the first shaft and second shaft are coupled to respective ones of a pair of rear wheels of a vehicle.

16. The assembly of claim 12 wherein the first shaft and second shaft are coupled to respective ones of a pair of front wheels of a vehicle.

* * * * *